United States Patent [19]

Nowottny et al.

[11] Patent Number: 4,946,268

[45] Date of Patent: Aug. 7, 1990

[54] LENGTH-ADJUSTABLE SPECTACLE TEMPLE

[75] Inventors: Norbert Nowottny, Leonberg; Jürgen Rössner, Stuttgart, both of Fed. Rep. of Germany

[73] Assignee: Marwitz & Hauser GmbH, Stuttgart, Fed. Rep. of Germany

[21] Appl. No.: 336,916

[22] Filed: Apr. 12, 1989

[30] Foreign Application Priority Data

Apr. 28, 1988 [DE] Fed. Rep. of Germany ....... 8805603

[51] Int. Cl.⁵ .............................................. G02C 5/20
[52] U.S. Cl. ..................................... 351/118; 351/119
[58] Field of Search ........................ 351/118, 119, 116

[56] References Cited

U.S. PATENT DOCUMENTS

| | | | |
|---|---|---|---|
| 3,544,204 | 12/1970 | Bienenfeld | 351/118 |
| 3,545,848 | 12/1970 | Sebastian | 351/118 |
| 3,584,938 | 6/1971 | Lindblom | 351/118 |
| 3,649,107 | 3/1972 | Hoffmaster et al. | 351/118 |
| 3,705,761 | 12/1972 | Fujisawa | 351/118 |
| 3,873,192 | 3/1975 | Anderson | 351/118 |
| 4,047,809 | 9/1977 | Zuccatti | 351/118 |
| 4,153,348 | 5/1979 | Walters et al. | 351/118 |

FOREIGN PATENT DOCUMENTS

| | | |
|---|---|---|
| 1022197 | 3/1928 | Fed. Rep. of Germany . |
| 1925231 | 11/1970 | Fed. Rep. of Germany . |
| 1338972 | 11/1973 | United Kingdom . |
| 2202961 | 10/1988 | United Kingdom . |

Primary Examiner—Paul M. Dzierzynski
Attorney, Agent, or Firm—Walter Ottesen

[57] ABSTRACT

The invention relates to a spectacle temple adjustable in length and made of several parts. One of the temple parts has a sleeve-shaped section into which a second temple part is inserted so as to be adjustable in length. This second temple part has indexing recesses on its portion which is inserted into the sleeve. At least one of these recesses is accessible through a cutout in the sleeve for a spring element insertable into the sleeve. The spring element form-tightly engages with one portion into the accessible indexing recess and thereby latches the two spectacle parts to each other.

10 Claims, 1 Drawing Sheet

U.S. Patent
Aug. 7, 1990
4,946,268
Fig. 1
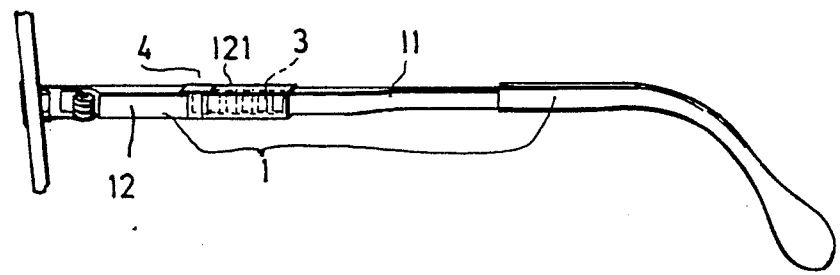
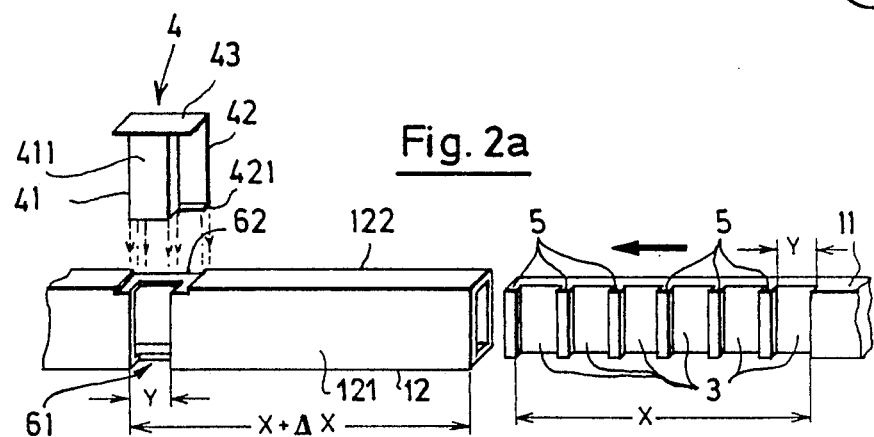
Fig. 2a
Fig. 3b    Fig. 3a
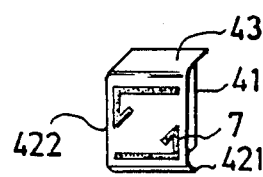    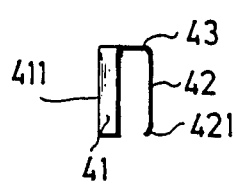
Fig. 2b    Fig. 4a    Fig. 4b
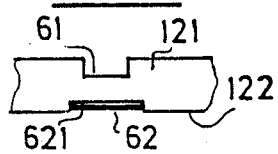    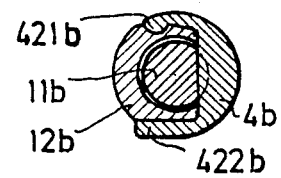    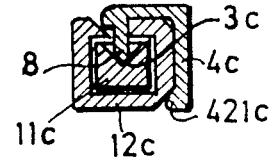

and is slidable in various positions.

LENGTH-ADJUSTABLE SPECTACLE TEMPLE

FIELD OF THE INVENTION

The subject matter of the invention is a spectacle temple adjustable in length and made of several parts. At least one temple part is slidable in a sleeve and is fixable in various positions.

BACKGROUND OF THE INVENTION

Length-adjustable spectacle temples are long known. In German Utility Model Registration DE-GM 1,022,197, such a temple is described for which two transversely divided temple halves are surrounded by a sleeve such that at least one spectacle part is slidable in this sleeve and fixable in different positions. The temple halves are latched in the selected position by means of a transverse screw. In addition to the inconvenient use of a separate sleeve, the type of latching provides that a change in length of the temple is only possible by using a screwdriver. This problem also occurs with the length-adjustable spectacle temple described in published German patent application DE-OS 1,925,231 wherein a sleeve has latching holes on its wide side into which cams arranged on the spectacle temple resiliently latch.

SUMMARY OF THE INVENTION

It is an object of the invention to provide a length-adjustable spectacle temple which is of simple configuration and which can be reliably and simply adjusted manually in length.

The first spectacle temple part has a sleeve-shaped section and can be connected directly to the hinge of the spectacle frame. It is also possible to correspondingly configure the ear part of the spectacle temple.

The second temple part is introduced into the sleeve of the first temple part and is latched in the selected position by inserting the spring element into the sleeve. A part of the spring element engages the indexing recesses of the slidable temple part through the cutout in the sleeve and fixes the temple part. This fixation can occur at different positions of the second temple part and thereby provide different lengths of the spectacle temple. The change of length of the temple can occur in several discrete steps. In an advantageous embodiment, the spring element is configured to be U-shaped and is inserted from above into the sleeve. The leg of the spring element engages an indexing recess in a form-tight manner and in this way fixes the two temple parts.

BRIEF DESCRIPTION OF THE DRAWINGS

The invention will now be described with reference to the drawings wherein:

FIG. 1 is a side elevation view of a spectacle frame having a length-adjustable spectacle temple according to an embodiment of the invention;

FIG. 2a is a detailed perspective view of the spectacle temple shown in FIG. 1 with the second temple part removed from the sleeve of the first temple part;

FIG. 2b is a view from below onto the part of the sleeve of FIG. 2a at which the latching of the two parts occurs;

FIG. 3a is a side view of a spring element which is used in the embodiment of FIGS. 1 and 2a;

FIG. 3b is a side perspective view of the spring element of FIG. 3a;

FIG. 4a is a section through another embodiment of a length-adjustable spectacle temple at the point of latching; and, FIG. 4b is a section through a further embodiment of a length-adjustable spectacle temple at the location where latching occurs.

DESCRIPTION OF THE PREFERRED EMBODIMENTS OF THE INVENTION

A length-adjustable spectacle temple 1 is shown in FIG. 1 as being hinge connected to a lens frame of a spectacle frame. Although only one temple is shown, it is understood that the spectacle frame contains two temples. Each temple comprises two parts (11 and 12). The temple part 12 is shown connected to a hinge of the frame of a spectacle frame and is configured as a sleeve 121 which is provided with access means such as a cutout 61. The second temple part 11 is introduced into the clear opening of the sleeve 121. The second temple part 11 is provided with indexing means in the form of indexing recesses 3 at its forward end over a section of length x. As shown in FIG. 2a, these indexing recesses are configured as slots 3 running perpendicularly to the temple axis. The temple part 11 is inserted into the sleeve 121 and is latched in the desired position by inserting a spring element 4.

As FIG. 2a shows, the indexing recesses of the temple part 11 comprise several rectangular grooves 3 which are separated from one another by center struts 5. The temple part 11 is pushed into the sleeve-shaped part 121 of the temple part 12. For this purpose, the interior of the sleeve-shaped part 121 is so configured that it can receive the moveable part 11 with only slight play. The end region of the moveable temple part 11 wherein the grooves 3 are located has a length x. The moveable spectacle temple must however be inserted into the sleeve-shaped part 12 for a distance $x + \Delta x$ until the first latching possibility exists, so that the grooves 3 are not visible even for the greatest extended length of the temple 1. The cutout 61 in the sleeve-shaped part 121 is located in the region between $x + \Delta x$ and $x + \Delta x - y$.

The spring element 4 is inserted in the region of this cutout 61. The correspondingly thickened leg 41 of the spring element 4 form-tightly engages in one of the slots 3 of the spectacle part 11 and thereby latches this spectacle part. In this position, the outer surface 411 of the spring element 4 is flush with the outer surface 122 of the sleeve 121. The U-shaped spring element 4 engages beyond the sleeve-shaped part 121. On the side 122 of the sleeve lying opposite of the opening 61, a recess 62 is provided in which a second leg 42 of this element 4 is guided in the mounted condition of the spring element 4. This leg 42 is a latching member and is bent somewhat inwardly at its lower end 421. With this end 421, the spring element 4 engages a latch catching surface beneath the sleeve-shaped part 12 of the spectacle temple 1 and in this way absolutely fixes the spring element 4.

The spring element 4 and the sleeve-shaped part 12 of the spectacle temple 1 are so matched to each other that all outer surfaces of the spring element 4 are flush with the corresponding outer surfaces of the sleeve-shaped part 12 when the spring element 4 is in the inserted position. The thickened leg 41 of the spring element 4 is configured so as to be narrower than the other two sides (42, 43) in the illustrated example as shown especially in FIG. 2a.

FIG. 2b shows the sleeve 12 in the region of the cutout 61 from below. The cutout 61 for fixing the moveable temple part 11 can be clearly seen. The cutout 62 for receiving the leg 42 of the U-shaped spring element 4 is located on the opposite-lying sleeve side 122. Furthermore, the additional recess 621 for the lower inwardly bent end 421 of the leg 42 can be seen.

FIGS. 3a and 3b show the spring element 4 in detail. FIG. 3a shows that the leg 41 projecting into the opening 61 is thickened. This thickened portion is so configured that it fills out a slot 3 of the spectacle part 11 in a form-tight manner after insertion of the spring element 4 into the sleeve 12. The opposite-lying leg 42 and the upper side 43 have the same material thickness. The lower end 421 of the side leg 42 is bent inwardly to assure a reliable attachment of the spring element 4 to the sleeve-shaped spectacle part 12. An engraving 7 (insignia, corporate symbol, et cetera) is applied to the side 422 of the spring element 4 facing outwardly.

FIG. 4a shows an embodiment of the innovation for a round spectacle temple at the latching location. The sleeve-shaped eye temple is identified by 12b. The moveable ear temple 11b is inserted into the eye temple 12b and latched with a resilient element 4b. This element has a self-clamping part 421b at one end and is so configured at its opposite-lying end 422b that a slight distance of the insert element 4b from the sleeve 12b is possible.

FIG. 4b shows an embodiment of an insert element 4c for which a wedge-shaped leg 8 engages through the sleeve 12c in a funnel-shaped bore 3c in the moveable spectacle part 11c. The insert element is self-clamping on the sleeve 12c with the thickening 421c.

It is understood that the foregoing description is that of the preferred embodiments of the invention and that various changes and modifications may be made thereto without departing from the spirit and scope of the invention as defined in the appended claims.

What is claimed is:

1. A length-adjustable spectacle temple for a spectacle frame, the spectacle temple comprising:
   first and second temple parts arranged along a common axis;
   said first temple part having an end portion defining a sleeve extending along said axis;
   said second temple part having an elongated end portion for telescopically engaging said sleeve;
   indexing means formed on said elongated end portion so as to extend along at least a portion thereof in the direction of said axis;
   access means formed in said sleeve; and,
   an insert piece manually insertable into and manually removable from said access means and having an engaging portion formed thereon for engaging said indexing means to selectively fix the position of said second part with respect to said first part;
   said sleeve having a latch catching surface formed thereon; and,
   said insert piece having a resiliently biased latching member formed thereon for snap engaging said latch catching surface when said insert piece is seated in said access means.

2. The length-adjustable spectacle temple of claim 1, said indexing means comprising a plurality of recesses formed on said elongated end portion arranged in a row one next to the other in the direction of said axis; said access means comprising at least one cutout formed in said sleeve so as to provide access to said recesses; and, said insert piece being insertable into said cutout so as to permit said engaging portion to engage on of said recesses in a form-tight manner thereby selectively fixing the position of said second part with respect to said first part.

3. A length-adjustable spectacle temple for a spectacle frame, the spectacle temple comprising:
   first and second temple parts arranged along a common axis;
   said first temple part having an end portion defining a sleeve extending along said axis;
   said second temple part having an elongated end portion for telescopically engaging said sleeve;
   indexing means formed on said elongated end portion so as to extend along at least a portion thereof in the direction of said axis;
   access means formed in said sleeve; and,
   an insert piece manually insertable into and manually removable from said access means and having an engaging portion formed thereon for engaging said indexing means to selectively fix the position of said second part with respect to said first part;
   said sleeve having a latch catching surface formed thereon;
   said insert piece having a resiliently biased latching member formed thereon for snap engaging said latch catching surface when said insert piece is seated in said access means;
   said indexing means including: a plurality of recesses formed on said elongated end portion arranged in a row one next to the other in the direction of said axis; said access means comprising at least one cutout formed in said sleeve so as to provide access to said recesses; and, said insert piece being insertable into said cutout so as to permit said engaging portion to engage one of said recesses in a form-tight manner thereby selectively fixing the position of said second part with respect to said first part;
   said recesses being respective slots formed on said elongated end portion so as to extend in a direction perpendicularly to said axis; and,
   said insert piece being a U-shaped piece and said engaging portion being a thickened leg of said piece configured so as to form-tightly engage on of said slots.

4. The length-adjustable spectacle of claim 3, said sleeve having first and second sides lying opposite each other and said cutout being formed in said first side; said sleeve having a sleeve recess formed in said second side thereof just ahead of said latch catching surface; and, said U-shaped piece having a second leg defining said resiliently biased latching member for form-tightly engaging said sleeve recess and said latch catching surface when said U-shaped piece is mounted in said sleeve.

5. The length-adjustable spectacle temple of claim 4, said second leg being bent over inwardly toward said sleeve for contact engaging said latch catching surface and holding said U-shaped piece tightly in place thereon.

6. A length-adjustable spectacle temple for a spectacle frame, the spectacle temple comprising:
   first and second temple parts arranged along a common axis;
   said first temple part having an end portion defining a sleeve extending along said axis;
   said second temple part having an elongated end portion for telescopically engaging said sleeve;

indexing means formed on said elongated end portion so as to extend along at least a portion thereof in the direction of said axis;

access means formed in said sleeve; and, an insert piece manually insertable into and manually removable from said access means and having an engaging portion formed thereon for engaging said indexing means to selectively fix the position of said second part with respect to said first part;

said sleeve having a latch catching surface formed thereon;

said insert piece having a resiliently biased latching member formed thereof for snap engaging said latch catching surface when said insert piece is seated in said access means;

said indexing means including: a plurality of recesses formed on said elongated end portion arranged in a row one next to the other in the direction of said axis; said access means comprising at least one cutout formed in said sleeve so as to provide access to said recesses; and, said insert piece being insertable into said cutout so as to permit said engaging portion to engage one of said recesses in a form-tight manner thereby selectively fixing the position of said second part with respect to said first part;

said recesses being respective bores formed in said elongated end portion so as to lie in a row next to the other; and, said insert piece being a U-shaped piece having a first leg defining said engaging portion and being configured so as to form-tightly engage one of said bores.

7. The length-adjustable spectacle temple of claim 6, said sleeve having first and second sides lying opposite each other and said cutout being formed in said first side; said sleeve having a sleeve recess formed in said second side thereof just ahead of said latch catching surface; and, said U-shaped piece having a second leg defining said resiliently biased latching member for form-tightly engaging said sleeve recess and said latch catching surface when said U-shaped piece is mounted in said sleeve.

8. The length-adjustable spectacle temple of claim 7, said second leg being bent over inwardly toward said sleeve for contact engaging said latch catching surface and holding said U-shaped piece tightly in place thereon.

9. The length-adjustable spectacle temple of claim 2, said sleeve having a first length and said indexing means extending along said elongated end portion for a predetermined second length; and, said second length being less than said first length.

10. A spectacle frame comprising:

a frame;

two length-adjustable temples pivotally connected to said frame;

each of said temples including first and second temple parts arranged along a common axis;

said first temple part having an end portion defining a sleeve extending along said axis;

said second temple part having an elongated end portion for telescopically engaging said sleeve;

indexing means formed on said elongated end portion so as to extend along at least a portion thereof in the direction of said axis;

access means formed in said sleeve; and, an insert piece manually insertable into and manually removable from said access means and having an engaging portion formed thereon for engaging said indexing means to selectively fix the position of said second part with respect to said first part;

said sleeve having a latch catching surface formed thereon; and, said insert piece having a resiliently biased latching member formed thereon for snap engaging said latch catching surface when said insert piece is seated in said access means.

* * * * *

UNITED STATES PATENT AND TRADEMARK OFFICE
CERTIFICATE OF CORRECTION

PATENT NO. : 4,946,268

DATED : August 7, 1990

INVENTOR(S) : Norbert Nowottny and Jürgen Rössner

It is certified that error appears in the above-identified patent and that said Letters Patent is hereby corrected as shown below:

In column 3, line 26: delete "4226" and substitute -- 422b -- therefor.

In column 4, line 2: delete "on" and substitute -- one -- therefor.

In column 4, line 45: delete "on" and substitute -- one -- therefor.

In column 5, line 13: delete "thereof" and substitute -- thereon -- therefor.

In column 5, line 27: insert -- one -- between "row" and "next".

Signed and Sealed this

Third Day of September, 1991

Attest:

HARRY F. MANBECK, JR.

*Attesting Officer*     *Commissioner of Patents and Trademarks*